United States Patent [19]

Suzuki

[11] 4,449,870

[45] May 22, 1984

[54] T-SLOT COVER

[75] Inventor: Masakazu Suzuki, Ibaraki, Japan

[73] Assignee: Suzuki Iron Works Co., Ltd., Tokyo, Japan

[21] Appl. No.: 396,862

[22] Filed: Jul. 9, 1982

[30] Foreign Application Priority Data

Oct. 29, 1981 [JP] Japan ................................ 56-173464

[51] Int. Cl.³ ............................................ B23Q 11/08
[52] U.S. Cl. ............................. 409/134; 29/DIG. 94; 308/3.5; 408/710; 409/219
[58] Field of Search ................. 409/134, 219; 29/1 R, 29/DIG. 61, DIG. 53, DIG. 94; 408/710; 308/3.5

[56] References Cited

U.S. PATENT DOCUMENTS

| | | | |
|---|---|---|---|
| 900,976 | 10/1908 | Bauer | 409/219 |
| 1,096,588 | 5/1914 | Baker et al. | 409/219 |
| 1,918,878 | 7/1983 | Tross | 409/134 X |
| 3,090,284 | 5/1963 | Dunning | 409/219 X |
| 3,195,415 | 7/1965 | Shorb | 409/219 |

FOREIGN PATENT DOCUMENTS 51-17751  6/1976  Japan .................................. 409/134

Primary Examiner—William R. Briggs
Assistant Examiner—Glenn Webb
Attorney, Agent, or Firm—Wenderoth, Lind & Ponack

[57] ABSTRACT

An adjustable T-slot cover for covering T-slots in such as a table of a machine tool and consisting of two intermeshing elongated section members. Each section member has in the crosssection a vertically extending web extending along the side wall of T-slots and which web has on the upper end a projection for engaging with chamfered upper edge of the side wall and on the lower portion a guide for resiliently abutting with the side wall. One section member has sidewisely extending first and second arms, and the other section member has a third arm extending between the first and second arms. Intermeshing indentations are formed between the second and third arms.

5 Claims, 4 Drawing Figures

T-SLOT COVER

BACKGROUND OF THE INVENTION

This invention relates to a T-slot cover for covering generally inverted T-shaped slots provided in such as a table of a machine tool.

The inverted T-shaped slots usually called as T-slots are provided for receiving therein so called T-nuts or T-bolts for locating and securing such as works on the table or the like, however, the slots are exposed in the upper surface of the table where the works are not located, therefore, the cutting fluid, cutting scraps, or dusts will drop into the slots. The cutting scraps or the like fixedly accumulate in the slots and it is difficult to remove them which impedes the usage of the slots.

It has been proposed a T-slot cover consisting of a generally H-shaped section sidewisely located in T-slots with one of the legs engaging with upper edges of the T-slot and the other of the legs abutting with the side walls of the T-slot to locate the section in the T-slot. The cover further comprises a plurality of orifices for passing therethrough fliud, so that cutting scraps will remain on the upper surface of the table and T-slot covers, and can easily be removed. However, since the width of T-slots varies with respect to machine tools, it is required to prepare various kinds of such sections.

SUMMARY OF THE INVENTION

One of the objects of the invention is to provide a T-slot cover having an adjustable width. The T-slot cover according to the invention comprises two elongated section members, each of the section members having in the crosssection a vertically extending web having a sidewisely and outwardly projecting projection for engaging with a chamfered upper edge portion of the T-slot thereby retaining the T-slot cover in the T-slot, and a sidewisely and outwardly projecting guide portion on the lower end portion thereof for engaging with the side wall of said T-shaped slot. One of the section members has in the crosssection a sidewisely and inwardly extending first arm defining generally flat upper and lower surfaces and a sidewisely and inwardly extending second arm spaced downsards from the first arm and defining thereon saw tooth or wave like indentations, and the other of the section members has in the crosssection a sidewisely and inwardly extending arm defining on the upper surface thereof a generally flat surface for slidably engaging with the flat lower surface of the first arm of the one section member and on the lower surface thereof correspondingly shaped indentations for adjustably engaging with the indentations of the second arm of one section member, whereby the width of the T-slot cover as defined by the distance between the guide portions can be adjusted to conform with the width of the T-slot.

Preferably, the sections are made of light alloy.

BRIEF DESCRIPTION OF THE DRAWINGS

The invention will now be explained in detail with reference to accompanying drawings which exemplify some preferred embodiments of the invention, in which.

DETAILED DESCRIPTION OF THE PREFERRED EMBODIMENT

Figure 1:
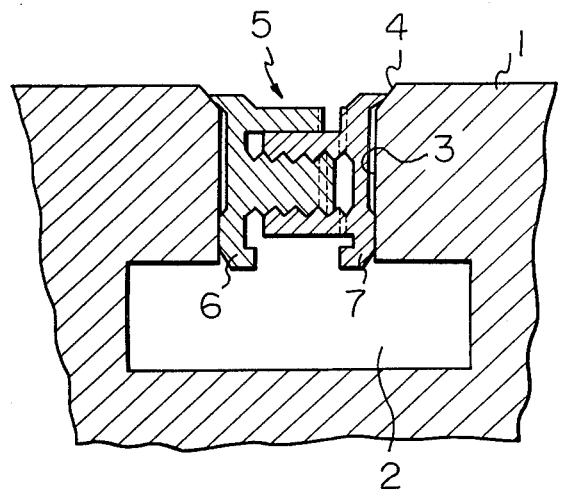
FIG. 1 is a sectional view of a T-slot cover according to the invention and being mounted in a T-slot in a table of a machine tool.

In FIG. 1, shown at 1 is such as a table of a machine tool, and has a plurality of generally inverted T-shaped slots 2 (only one is shown in the drawing and which is usually called as T-slot). The slot 2 receives therein T-nuts or T-bolts and is utilized to fix such as works on the table 1. The configuration of the T-slots are standardized by such as JIS (Japanese industrial standard) B-0952 and are denoted by the width of upper groove portion 3 thereof. As shown in FIG. 1, a portion of the slot 2 which is not utilized in fixing the works or the like on the table 1 is covered by a T-slot cover according to the invention.

The T-slot cover 5 consists of two elongated section members 6 and 7 formed respectively of a light alloy such as an aluminium alloy. Each of the section members 6, 7 has, in the crosssection, a vertically extending web 8, 9 having a sidewisely and outwardly projecting projection 10, 11 on the upper end thereof for engaging with a chamfered upper edge portion 4 of the T-slot 2, and a sidewisely and outwardly projecting guide portion 12, 13 for engaging with the side wall of the slot 2 (the groove portion 3). The projection 10 and 11 act to retain the T-slot cover 5 in the T-slot 2. The section member 6 further has, in the crosssection, a sidewisely and inwardly extending first arm 14 defining a generally flat upper surface 14a and a generally flat lower surface 18 thereon, and a sidewisely and inwardly extending second arm 16 which is spaced downwards from the first arm 14. The second arm 16 defines thereon saw tooth like indentations 20 and 22 on the upper and lower surfaces thereof. The other section member 7 has, in the crosssection, a sidewisely and inwardly extending third arm 15 which defines on the upper surface thereof a generally flat surface 19 for snugly engaging with the flat lower surface 18 of the first arm 14 of the section member 6 and, on the lower surface thereof, saw tooth like indentations 21 for engaging with the indentations 20 of the second arm 16 of the section member 6. Further, the section member 7 has a fourth arm 17 extending sidewisely and inwardly from the web 9. Correspondingly shaped indentations 23 are formed on the upper surface of the fourth arm 17 and engage with indentations 22 of the second arm 16 of the section member 6. The engagement between indentations 20 and 21 and between indentations 22 and 23 restricts the relative movement between the section members 6 and 7 to only in the longitudinal direction of in the direction vertical to the paper of FIG. 2. The indentations 20, 21, 22 and 23 define a predetermined pitch in the sidewise direction so that the width of the T-slot cover 5 or the distance between guiding portions 12 and 13 can be adjusted by the pitch. It will be noted that FIGS. 1 and 2 are substantially equal but the width of the T-slot cover is adjusted in FIG. 2 to the T-slot having the width thereof different from that of FIG. 1.

A plurality of small holes or orifices are formed in the T-slot cover for passing thereacross liquid such as cutting fluid. As shown in FIG. 2, vertically extending grooves 26, vertically extending holes 28, vertically extending holes 27 having on the upper end portion semi-circular grooves, and vertically extending holes 29 are formed respectively in the first, second, third and fourth arms 14, 16, 15 and 17 respectively. The grooves and holes define respectively vertically extending through holes when the section members 6 and 7 take the sidewisely most reduced configuration, however, when the members 6 and 7 define the configuration shown in FIG. 2, the holes 27 and 29 act to pass liquid vertically across the T-slot cover. The diameter of these holes is determined not to pass cutting scraps or the like therethrough.

Figure 2:
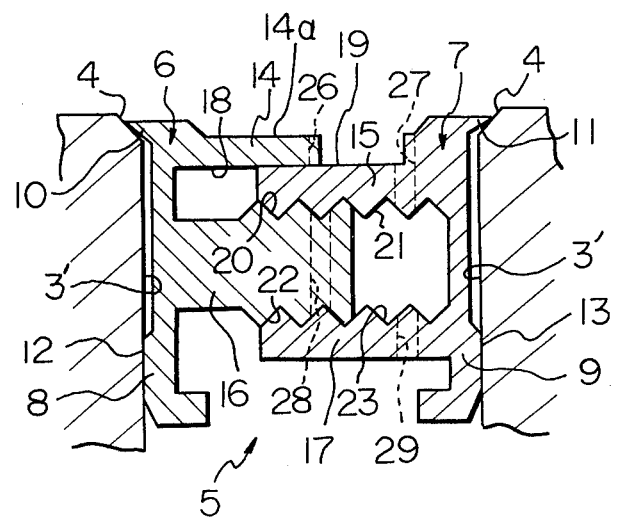
FIG. 2 is an enlarged sectional view of the T-slot cover of FIG. 1 but the width of the cover is not equal to that of FIG. 1.
Figure 3:
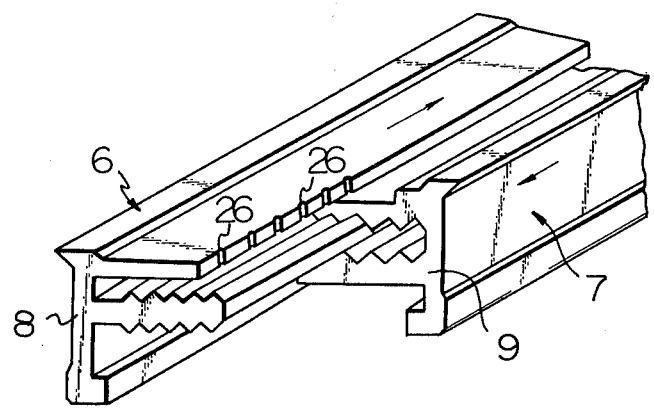
FIG. 3 is a perspective view of the T-slot cover of FIG. 1.

When it is desired to change the width of the T-slot cover, the section members 6 and 7 are relatively displaced in the lengthwise direction until the two members separate from one another, thereafter, the relative engaging positions between indentations 20 and 21 and 22 and 23 are changed such that the condition of FIG. 1 to that of FIG. 2, and the two section members 6 and 7 are displaced relative to each other in the longitudinal direction as shown in arrow lines in FIG. 3 until the longitudinal opposite ends of section members 6 and 7 align with each other.

Figure 4:
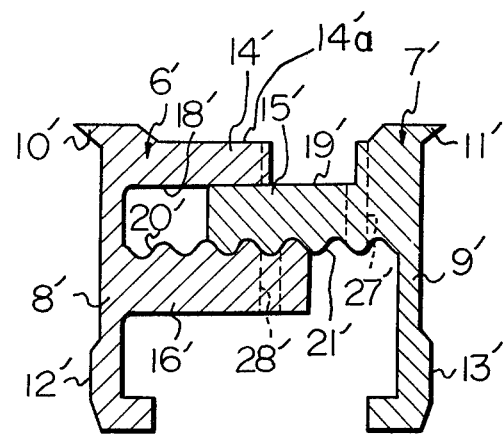
FIG. 4 is a sectional view similar to FIG. 2 but showing a modified form.

FIG. 4 shows another embodiment of the invention, wherein parts corresponding to the embodiment of FIG. 2 are denoted by the same reference numerals with a prime, and detailed description therefor is omitted.

In the embodiment of FIG. 4, the fourth arm 17 in the first embodiment is omitted, and indentations 20' and 21' have wave like configuration, but the function and advantages are similar to the first embodiment.

Preferably, the guide portions 12, 13, 12' and 13' resiliently engage with the side walls of the T-slot. In the embodiments, the resiliency of the web 8 in the first embodiment and the resiliency of webs 8' and 9' in the second embodiment act to resiliently displace the guide portion 12 and guide portions 12' and 13' in the sidewise direction in fitting the T-slot cover in the T-slot.

According to the invention, the T-slot cover can be fitted in T-slots of various sizes, and effectively prevents such as cutting scraps from falling into T-slots thereby enabling to maintain the surface of the table of a machine tool clean and to collect cutting oil or the like.

What is claimed is:

1. A T-slot cover for covering generally inverted T-shaped slots (T-slots) in such as a table of a machine tool, said cover comprising two elongated section members, each of said section members having in the crosssection a vertically extending web having a sidewisely and outwardly projecting projection for engaging with a chamfered upper edge portion of said T-slot thereby retaining the T-slot cover in the T-slot, and a sidewisely and outwardly projecting guide portion on the lower end portion thereof for engaging with the side wall of said T-slot, one of said section members having in the crosssection a sidewisely and inwardly extending first arm defining generally flat upper and lower surfaces and a sidewisely and inwardly extending second arm spaced downwards from said first arm and defining thereon saw tooth or wave like indentations, the other of said section members having in the crossection a sidewisely and inwardly extending arm defining on the upper surface thereof a generally flat surface for slidably engaging with the flat lower surface of said first arm of said one section member and on the lower surface thereof correspondingly shaped indentations for adjustably engaging with said indentations of said second arm of said one section member, whereby the width of said T-slot cover as defined by the distance between said guide portions can be adjusted to conform with the width of the T-slot.

2. A T-slot cover according to claim 1 wherein a plurality of vertically extending oil passages are formed in said T-slot cover.

3. A T-slot cover according to claim 1 wherein said second arm of said one section member further has on the lower surface thereof similarly shaped indentations, and the said other section member has another sidewisely and inwardly extending arm defining on the upper surfaces thereof similarly shaped indentations for engaging with said indentations of the lower surface of said second arm of said one section member.

4. A T-slot cover according to claim 1 wherein said indentations have saw tooth like shape of a constant pitch.

5. A T-slot cover according to claim 1 wherein said indentations have wave like form of a constant pitch.

* * * * *